United States Patent
Layton

(10) Patent No.: US 8,589,281 B1
(45) Date of Patent: Nov. 19, 2013

(54) INVESTING IN EXCHANGE TRADED FUNDS USING TRADING BLOCKS OF PURCHASES WITH CONDITIONAL SALES

(71) Applicant: Lamar L. Layton, Draper, UT (US)

(72) Inventor: Lamar L. Layton, Draper, UT (US)

(73) Assignee: Decisive Investor, LLC, Draper, UT (US)

( * ) Notice: Subject to any disclaimer, the term of this patent is extended or adjusted under 35 U.S.C. 154(b) by 0 days.

(21) Appl. No.: 13/685,482

(22) Filed: Nov. 26, 2012

(51) Int. Cl.
*G06Q 40/00* (2012.01)
(52) U.S. Cl.
USPC .............................................. 705/37; 705/35
(58) Field of Classification Search
USPC ..................................................... 705/35, 37
See application file for complete search history.

(56) References Cited

U.S. PATENT DOCUMENTS

| | | | | |
|---|---|---|---|---|
| 2004/0225586 A1* | 11/2004 | Woods et al. | ................... | 705/35 |
| 2007/0022039 A1* | 1/2007 | Brennan | ........................ | 705/37 |

\* cited by examiner

*Primary Examiner* — Samica L Norman
(74) *Attorney, Agent, or Firm* — Kirton McConkie; Michael F. Krieger

(57) ABSTRACT

The present invention is directed to investing in exchange traded funds (ETF) using trading blocks of purchases with conditional sales. The present invention determines a number of trading blocks which each define a price of an ETF at which a purchase and sale will be made. Each block defines a purchase price and a sale price. When the ETF reaches the purchase price defined in a block, a purchase of a specified number of shares in the ETF is made, and a conditional sale order is activated so that the purchased shares are sold when the ETF reaches the sale price. The trading blocks can be defined such that the purchase price in each block is spaced thereby causing multiple purchases and sales to be made as the price of the ETF moves over a period of time. In this way, an investor can capitalize on the volatility of an ETF.

20 Claims, 7 Drawing Sheets

200

| Blocks 201 | Purchase Price 202 | Sale Price 203 |
|---|---|---|
| Block_6 | 74 | 75 |
| Block_5 | 73 | 74 |
| Block_4 | 72 | 73 |
| Block_3 | 71 | 72 |
| Block_2 | 70 | 71 |
| Block_1 | 69 | 70 |

| Trading Block | Order Status | Action |
|---|---|---|
| 98.60 | | No action |
| 96.29 | | No action |
| 94.08 | Placed | Sell 201 shares at 96.29 |
| 91.83 | Placed | Sell 226 shares at 94.08 |
| 89.68 | Placed | Sell 215 shares at 91.83 |
| 87.59 | Placed | Sell 222 shares at 89.68 |
| 85.51 | Placed | Sell 235 shares at 87.59 |
| 83.51 | Placed | Sell 236 shares at 85.51 |
| 81.56 | Placed | Sell 239 shares at 83.51 |
| 79.65 | Placed | Sell 246 shares at 81.56 |
| 77.78 | Placed | Sell 251 shares at 79.65 |
| 75.96 | Placed | Sell 256 shares at 77.78 |
| 74.18 | Placed | Sell 262 shares at 75.96 |
| 72.44 | Placed | Sell 275 shares at 74.18 |
| 70.74 | Placed | Sell 280 shares at 72.44 |
| 69.08 | Placed | Sell 285 shares at 70.74 |
| 67.47 | Placed | Sell 293 shares at 69.08 |
| 65.89 | Placed | Sell 316 shares at 67.47 |
| 64.34 | Placed | Sell 353 shares at 65.89 |
| 62.83 | Placed | Sell 390 shares at 64.34 |
| 61.36 | Placed | Sell 371 shares at 62.83 |
| 59.92 | Placed | Sell 378 shares at 61.36 |
| 58.52 | Placed | Buy 388 shares at 58.52, Sell at 59.92 |
| 57.15 | Placed | Buy 397 shares at 57.15, Sell at 58.52 |
| 55.81 | Placed | Buy 407 shares at 55.81, Sell at 57.15 |
| 54.50 | | Buy 416 shares at 54.50, Sell at 55.81 |
| 53.22 | | Buy 426 shares at 53.22, Sell at 54.50 |
| 51.97 | | Potential Buy |
| 50.76 | | Potential Buy |
| 49.57 | | Potential Buy |
| 48.40 | | Potential Buy |
| 47.27 | | Potential Buy |
| 46.16 | | Potential Buy |
| 45.08 | | Potential Buy |
| 44.02 | | Potential Buy |
| 42.99 | | Potential Buy |
| 41.98 | | Potential Buy |
| 41.00 | | Potential Buy |
| 40.04 | | Potential Buy |
| 39.10 | | Potential Buy |
| 38.18 | | Potential Buy |
| 37.29 | | Potential Buy |
| 36.42 | | Potential Buy |
| 35.56 | | Potential Buy |
| 34.73 | | Potential Buy |
| 33.91 | | Potential Buy |
| 33.12 | | Potential Buy |
| 32.34 | | Potential Buy |
| 31.59 | | No action |
| 30.84 | | No action |
| 30.12 | | No action |
| 29.42 | | No action |
| 28.73 | | No action |
| | | Total Cost Basis Profits |

401 brackets rows from 94.08 to 55.81
402 brackets rows 54.50 and 53.22
403 brackets rows from 58.52 to 53.22

FIG. 4

| # INVESTING IN EXCHANGE TRADED FUNDS USING TRADING BLOCKS OF PURCHASES WITH CONDITIONAL SALES

CROSS-REFERENCE TO RELATED APPLICATIONS

Not Applicable.

BACKGROUND

Exchange Traded Funds (ETFs), in general terms, are funds that track indexes like the NASDAQ-100 Index, S&P 500, Dow Jones, etc., but are traded like stock on an exchange. ETFs experience price changes throughout the day as they are bought and sold. Accordingly, ETFs provide the diversification of an index fund as well as the ability to sell short, buy on margin, and purchase as little as one share.

Many ETFs exist. For example, the Spider is an ETF that tracks the S&P 500 index, and the DIAMONDS Trust is an ETF that tracks the Dow Jones Industrial Average. Another ETF, the Direxion Daily Small Cap Bull 3× Shares fund (the TNA fund), is based on the Russell 2000 index but is traded at three times the movement of the Russell 2000 index. For example, if the Russell 2000 index moves 2%, the TNA fund will move 6%.

BRIEF SUMMARY

The present invention extends to methods, systems, and computer program products for investing in ETFs using trading blocks of purchases with conditional sales. The present invention determines a number of trading blocks which each define a price of an ETF at which a purchase and sale will be made. Each block defines a purchase price and a sale price. When the ETF reaches the purchase price defined in a block, a purchase of a specified number of shares in the ETF is made, and a previously placed conditional sale order is activated so that the purchased shares are sold when the ETF reaches the sale price. The trading blocks are defined such that the purchase price in each block is spaced thereby causing multiple purchases and sales to be made as the price of the ETF moves over a period of time. In this way, an investor can capitalize on the volatility of an ETF.

In one embodiment, a computer system receives a growth rate that an investor desires to obtain on an investment amount. The computer system calculates a plurality of trading blocks based on the desired growth rate. Each trading block defining a purchase price, a sale price, and a percentage of the investment amount to be used to purchase shares of the ETF at the defined purchase price.

For each trading block, the purchase price defines a price of the ETF at which a purchase order is to be placed to buy shares of the ETF using the defined percentage of the investment amount, and the sale price defines a price of the ETF for which a conditional sale order is to be placed, when the purchase order is placed, to sell the purchased shares of the trading block.

In another embodiment, a computer system receives a growth rate that an investor desires to obtain on an investment amount. The computer system calculates a plurality of trading blocks based on the desired growth rate, each trading block defining a purchase price, a sale price, and a percentage of the investment amount to be used to purchase shares of the ETF at the defined purchase price It is determined that the ETF is trading at the purchase price of a first trading block. A purchase order is then generated to purchase shares of the ETF at the purchase price of the first trading block using the percentage of the investment amount defined for the first trading block. A conditional sale order is also placed to sell the purchased shares of the first trading block when the ETF is trading at the sell price of the first trading block.

In another embodiment, a computer system receives a growth rate that an investor desires to obtain on an investment amount. The computer systems calculates a plurality of trading blocks based on the desired growth rate, each trading block defining a purchase price, a sale price, and a percentage of the investment amount to be used to purchase shares of the ETF at the defined purchase price.

For at least one trading block, a conditional purchase order is generated to purchase shares of the ETF at the purchase price of the trading block using the percentage of the investment amount defined for the trading blocks. For each of the at least one trading blocks, a conditional sale order is also generated to sell the purchased shares of the trading block when the ETF is trading at the sell price of the trading block.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 2 illustrates an exemplary data structure that defines a plurality of trading blocks;

FIG. 4 illustrates an exemplary chart that lists the purchase price for multiple trading blocks along with actions for each block.

DETAILED DESCRIPTION

Figure 1:
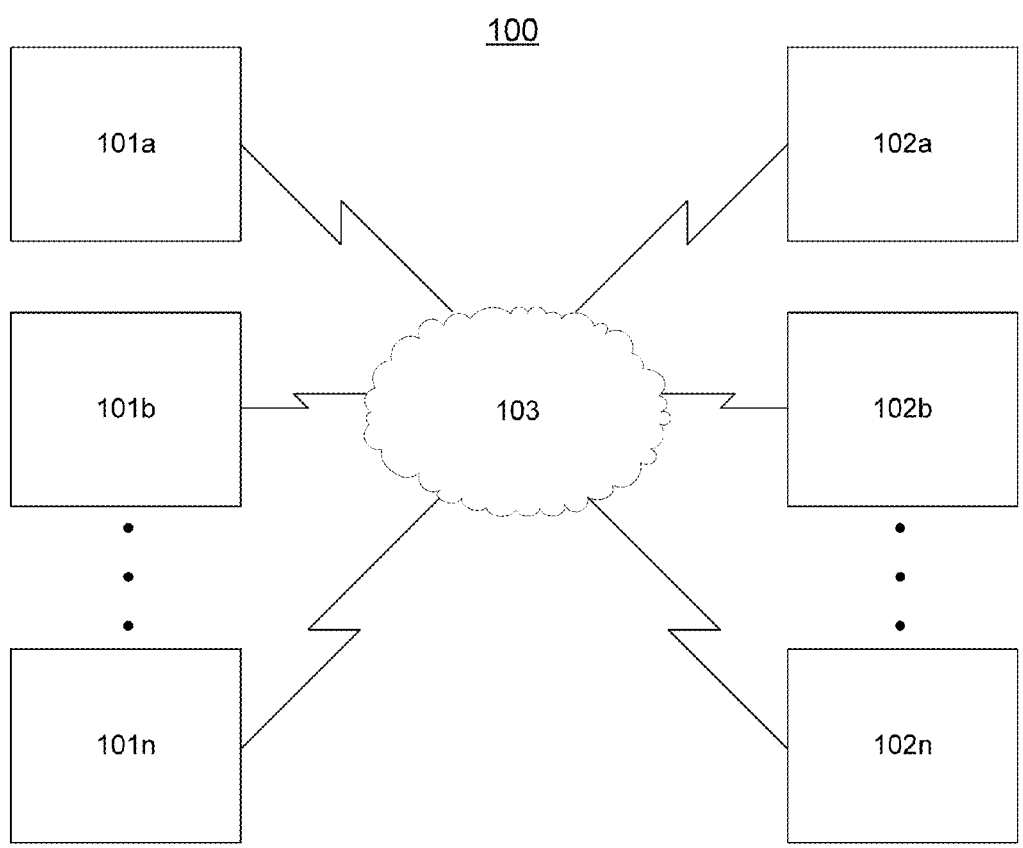
FIG. 1 illustrates an exemplary computer environment in which the present invention can be implemented.

The present invention extends to methods, systems, and computer program products for investing in ETFs using trading blocks of purchases with conditional sales. The present invention determines a number of trading blocks which each define a price of an ETF at which a purchase and sale will be made. Each block defines a purchase price and a sale price. When the ETF reaches the purchase price defined in a block, a purchase of a specified number of shares in the ETF is made, and a previously placed conditional sale order is activated so that the purchased shares are sold when the ETF reaches the sale price. The trading blocks are defined such that the purchase price in each block is spaced thereby causing multiple purchases and sales to be made as the price of the ETF moves over a period of time. In this way, an investor can capitalize on the volatility of an ETF.

In one embodiment, a computer system receives a growth rate that an investor desires to obtain on an investment amount. The computer system calculates a plurality of trading blocks based on the desired growth rate. Each trading block defining a purchase price, a sale price, and a percentage of the investment amount to be used to purchase shares of the ETF at the defined purchase price.

For each trading block, the purchase price defines a price of the ETF at which a purchase order is to be placed to buy shares of the ETF using the defined percentage of the investment amount, and the sale price defines a price of the ETF for which a conditional sale order is to be placed, when the purchase order is placed, to sell the purchased shares of the trading block.

In another embodiment, a computer system receives a growth rate that an investor desires to obtain on an investment amount. The computer system calculates a plurality of trading blocks based on the desired growth rate, each trading block defining a purchase price, a sale price, and a percentage of the investment amount to be used to purchase shares of the ETF at the defined purchase price It is determined that the ETF is trading at the purchase price of a first trading block. A purchase order is then generated to purchase shares of the ETF at the purchase price of the first trading block using the percentage of the investment amount defined for the first trading block. A conditional sale order is also placed to sell the purchased shares of the first trading block when the ETF is trading at the sell price of the first trading block.

In another embodiment, a computer system receives a growth rate that an investor desires to obtain on an investment amount. The computer systems calculates a plurality of trading blocks based on the desired growth rate, each trading block defining a purchase price, a sale price, and a percentage of the investment amount to be used to purchase shares of the ETF at the defined purchase price.

For at least one trading block, a conditional purchase order is generated to purchase shares of the ETF at the purchase price of the trading block using the percentage of the investment amount defined for the trading blocks. For each of the at least one trading blocks, a conditional sale order is also generated to sell the purchased shares of the trading block when the ETF is trading at the sell price of the trading block.

Embodiments of the present invention may comprise or utilize special purpose or general-purpose computers including computer hardware, such as, for example, one or more processors and system memory, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system.

Computer-readable media is categorized into two disjoint categories: computer storage media and transmission media. Computer storage media (devices) include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other similarly storage medium which can be used to store desired program code means in the form of computer-executable instructions or data structures and which can be accessed by a general purpose or special purpose computer. Transmission media include signals and carrier waves.

Computer-executable instructions comprise, for example, instructions and data which, when executed by a processor, cause a general purpose computer, special purpose computer, or special purpose processing device to perform a certain function or group of functions. The computer executable instructions may be, for example, binaries, intermediate format instructions such as assembly language or P-Code, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like.

The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices. An example of a distributed system environment is a cloud of networked servers or server resources. Accordingly, the present invention can be hosted in a cloud environment.

FIG. 1 illustrates an exemplary computer environment 100 in which the present invention can be implemented. Computer environment 100 includes network 103 which interconnects computer systems 101a-101n, 102a-102n. In a typical implementation, computer environment can represent an internet configuration where computer systems 101a-101n are server computing systems and computer systems 102a-102n are client computer systems such as personal computers, tablets, mobile phones, etc. Computer environment 100 represents that a user can use any number of computer devices to communicate with any number of other computer devices to implement the acts of the invention.

FIG. 2 illustrates an exemplary data structure 200 that defines a plurality of trading blocks 201. Each of trading blocks 201 includes a defined purchase price 202 and a defined sale price 203. In some embodiments, as shown, trading blocks 201 can be arranged such that the sale price 203 of one block is the purchase price 202 of the next block. For example, Block_1's sale price and Block_2's purchase price are both $70.

It is noted that the purchase and sale prices in the blocks of data structure 200 have been specified as whole dollar amounts for simplicity. However, in many embodiments, the purchase and sale prices of each block can be calculated based on a formula. For example, the block prices can be determined based on the average volatility of the fund. With respect to the TNA which has a volatility that is three times that of the market, each block's purchase price can be approximately 2.4% greater from the previous block's purchase price. When blocks are arranged in this manner, it is more likely that at least one block will be purchased and sold in a day.

Additionally, the block prices for one investor can be different from the block prices of other investors. For example, if one or more persons have already been assigned block prices, another person can be assigned block prices that are different than those assigned to the one or more other persons (e.g. block_1 can have a purchase price of $69.50 for one investor, and a purchase price of $69.68 for another investor).

A trading block is purchased when the ETF trading price decreases to the purchase price 202 of the trading block. Then, the trading block is sold when the ETF trading price increases to the sale price 203 of the trading block. Purchase orders and conditional sale orders are placed in advance to allow these purchases and sales to occur automatically as the ETF trading price reaches the appropriate value.

Figure 3:
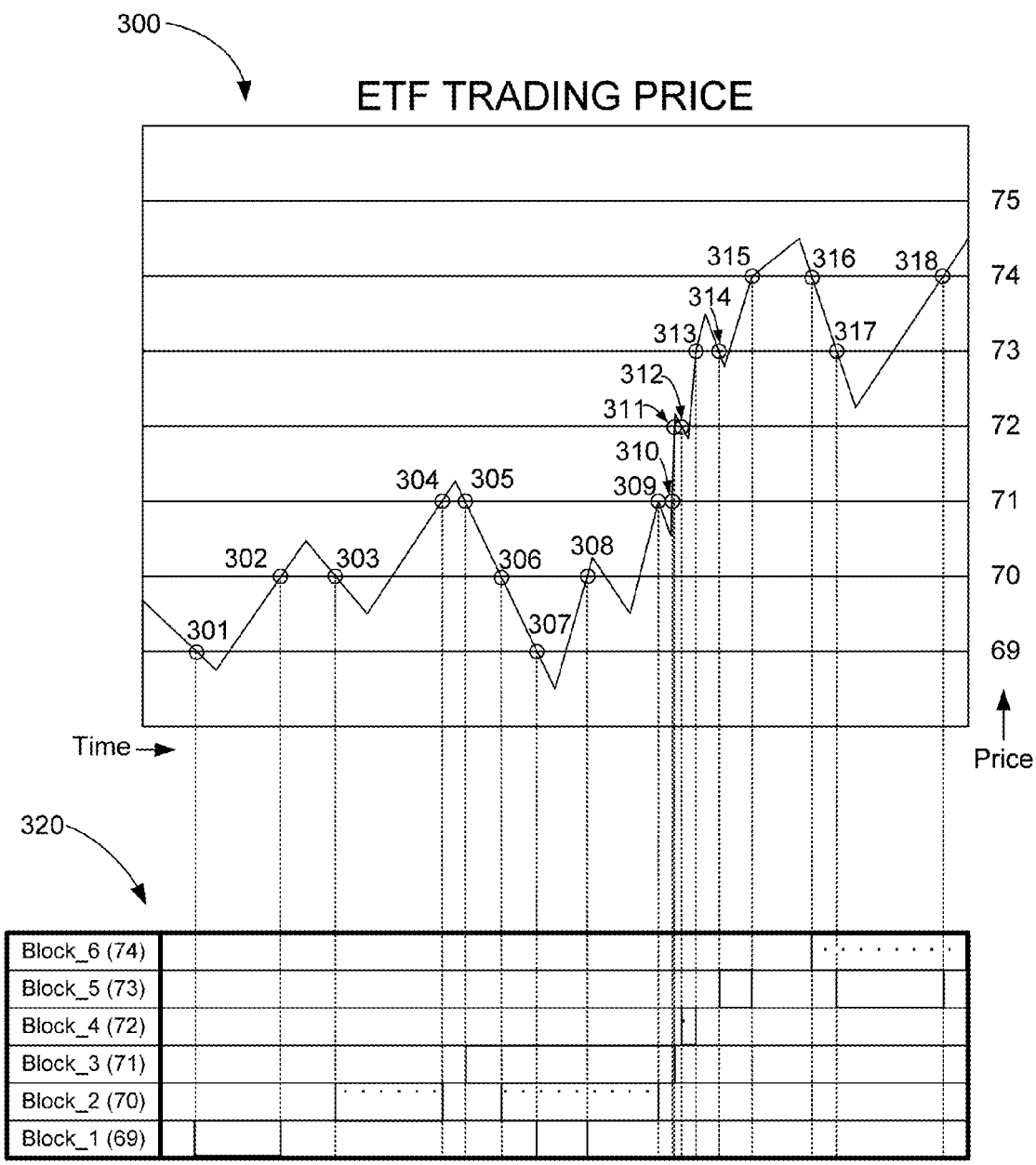
FIG. 3 illustrates an exemplary chart of how trading blocks of an ETF are purchased and sold.

FIG. 3 provides a chart that illustrates how trading blocks are purchased and sold. FIG. 3 includes a graph 300 showing the change in the ETF trading price during a period of time. FIG. 3 also includes a diagram 320 showing when trading blocks 1 through 6 of FIG. 2 are purchased and sold based on the ETF trading price. In diagram 320, the time when a block is held (i.e. the time between the purchase and sale of the block) is shown with diagonal lines.

As shown, the ETF trading price is initially decreasing and crosses the $69 mark at time 301. Because block_1's purchase price is $69 and the EFT trading price decreases to $69, a trading block of the ETF (block_1) is purchased at time 301 for $69/share (because a purchase order and a conditional sale order was previously placed to buy and sell block_1 shares at $69 and $70 respectively as shown in FIG. 2). At time 301 the conditional sale order is activated at $70.

As the ETF trading price reaches $70 at time 302, the conditional sale order for the block_1 shares is executed. Accordingly, as shown by the diagonal lines in the block_1 row of diagram 320, block_1 shares are held from time 301 to time 302.

As the ETF trading price decreases to block_2's defined purchase price of $70, a trading block of block_2 shares is purchased at time 303, and a previously placed conditional sale order to sell the purchased block_2 shares at the defined sale price of $71 is activated. The block_2 shares are therefore sold at time 304 when the ETF trading price reaches $71.

Similarly, at time 305, a trading block is purchased at the defined block_3 purchase price of $71. As shown, the block_3 shares are not sold until time 311 when the ETF trading price reaches $72, the defined sale price for block_3 shares. During this time while block_3 shares are held, two other trading blocks, block_1 and block_2, are purchased and sold. The block_2 shares are purchased at time 306 when the ETF trading price reaches $70 and sold at time 309 when it reaches $71. Similarly, the block_1 shares are purchased and sold when the ETF trading price reaches $69 and $70 respectively.

The remainder of graph 300 and diagram 320 illustrate how block_4 through block_6 shares are purchased in the same manner. It is noted that if a block is already held when the ETF trading price decreases to the purchase price of the held block (e.g. just after time 308 when the ETF trading price decreases to $70 while block_2 is already held), the block is not again purchased. In other words, multiple purchases of the same block are not held simultaneously.

As can be seen, trading blocks, which are each generally a small portion of an investor's investment, can be frequently purchased and sold at a relatively small gain. However, because of the volatility of the ETF, these many small gains combined can provide substantial growth in an investor's portfolio. For this reason, the use of trading blocks as described above is particularly beneficial when investing in highly volatile funds such as the TNA ETF.

In some simplified embodiments, a specified dollar amount is used to purchase shares at each block defined purchase price. In other words, if an investor has $200,000 in his portfolio, a small percentage of the $200,000 can be used to purchase shares for each trading block. For example, a percentage, such as 2.84%, can be specified as the amount of the total portfolio that is used to purchase shares for a trading block. In this case, $5,680 (2.84% of $200,000) can be used to purchase shares for each trading block.

Referring to the example in FIGS. 2 and 3, using these amounts, at time 301, 82 shares would be purchased at $69/share because $5,680/$69=82. Then, at time 302, the 82 shares in block_1 would be sold for $70/share yielding a profit of $82 (minus any commissions).

By using a small percentage of an investor's funds for each trading block, the investor will only become fully invested when the ETF's trading price declines a substantial amount (e.g. when 35 trading blocks (100/2.84≈35) are held at the same time which would occur if the ETF in FIGS. 2 and 3 declined $35 after the investor began buying trading blocks).

The percentage used to purchase shares at each trading block price is based on a desired growth rate and is dynamically calculated based on the results of previous sales of trading block shares.

For example, based on the desired growth rate, a profit amount can be determined. Because the purchase and sale price of each block is known before purchasing the trading block, it can be determined how many shares of the ETF need to be purchased at the purchase price to obtain the desired growth rate.

For example, if an investor has $200,000 and desires a growth rate of 20%, the annual growth amount desired is $40,000. Assuming 1.1 days per trading block profit, it requires 332 profitable blocks per year (365/1.1=332). The trading block profit for each trade needs to be $120.48 plus commissions (which are assumed to be a total of $16.00 for the buy and sell commissions) or $136.48 ($40,000/332=$120.48+$16=$136.48). Assuming a 2.40% profit per trading block, the total purchase amount for each trading block will be $5,687 ($136.48/2.40%=$5,687). This will allow for the simultaneous holding of 35 trading blocks before becoming fully invested ($200,000/$5,686≈35).

FIG. 4 illustrates an exemplary chart 400 that lists the purchase price for multiple trading blocks along with actions that have been or will be taken when the ETF reached or reaches the purchase price. As shown, chart 400 includes a Trading Block column that identifies the trading block which in this case uses the purchase price of the trading block as the identifier, an Order Status column, and an Action column that identifies the action to be taken with respect to the trading block.

The Trading Block column identifies that many different trading blocks have been defined for the investor. Many of the trading blocks (as identified by 401 and having the order status of "Placed") have been purchased (or a purchase order has been placed in the case of the 58.52, 57.15, and 55.81 trading blocks). Similarly, the Action column lists the conditional sale order that is placed when the trading block shares are purchased. For example, the $94.03 trading block comprises 191 shares that were purchased for $94.03 with a conditional order to sell the 191 shares when the ETF reaches $96.29.

FIG. 4 also illustrates an example range of trading blocks that may be purchased within an investor's plan. As shown, the range includes 46 blocks from $32.34 to $94.03. Blocks outside this range, as identified with "no action" in the Action column, would not be purchased under the current plan. In this example, the investor would become fully (i.e. 100%) invested when the 46 blocks are simultaneously held. In other words, the average block size under this plan is 2.17% of the investor's funds (100/46=2.17%). As such, an average of 2.17% of the investor's funds will be used to purchase shares at the purchase price of each trading block. Also, a range defined for an investor can be adjusted if the ETF price moves outside the range while the investor is not fully invested.

FIG. 4 also shows that at any given time, a certain number of purchase and conditional sale orders can be placed. For example, the $54.50 and $53.22 trading blocks (as identified by 402) do not yet have an order status but are assigned an action comprising the number of shares to purchase when the fund reaches the defined purchase price and the price at which the conditional sale order will be executed. The other trading blocks having an action of "potential buy" are blocks for which the number of shares to purchase has not yet been calculated, and therefore no conditional purchase order has been placed.

In some embodiments, conditional purchase and sale orders for a certain number of trading blocks (e.g. 3-5 trading blocks as identified by 403) can be maintained at any given time. In other words, the invention can calculate the number of shares to purchase for the next 5 trading blocks (based on the desired growth rate and the actual growth that has occurred from previous trades) to ensure that conditional orders are in place when the fund reaches the corresponding purchase price.

Accordingly, the present invention allows an investor to specify a desired growth rate for his investment funds to receive a range of trading blocks each with a defined purchase and sale price and a specified amount of shares to purchase at the defined purchase price. In some embodiments, this information can be provided to the investor (e.g. in a spreadsheet, mobile app, web based, or any other appropriate format) to allow the investor to make the appropriate purchase and conditional sale orders. In other embodiments, if securities law allows, the present invention can also be configured to automatically make purchase and conditional sale orders based on the defined range of trading blocks (e.g. by communicating directly with a trading brokerage such as Fidelity, Charles Schwab, E*TRADE, etc.).

Figure 5:
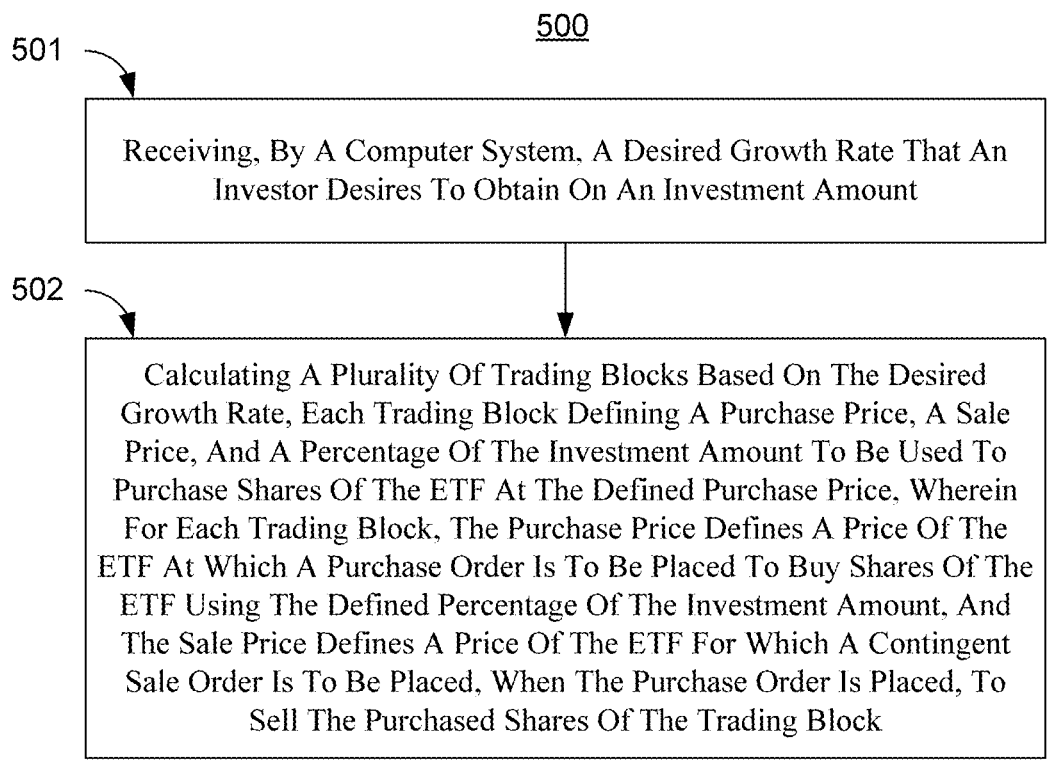
FIGS. 5-7 illustrate flowcharts of various exemplary methods for implementing the present invention.

FIG. 5 illustrates a flow chart of an exemplary method 500 for defining trading blocks for investing in an ETF. Method 500 will be described with reference to the figures.

Method 500 includes an act 501 of receiving a desired growth rate that an investor desires to obtain on an investment amount. For example, a desired growth rate of 20% can be received on an investment amount of $200,000.

Method 500 includes an act 502 of calculating a plurality of trading blocks based on the desired growth rate. Each trading block defines a purchase price, a sale price, and a percentage of the investment amount to be used to purchase shares of the ETF at the defined purchase price.

For each trading block, the purchase price defines a price of the ETF at which a purchase order is to be placed to buy shares of the ETF using the defined percentage of the investment amount, and the sale price defines a price of the ETF for which a conditional sale order is to be placed, when the purchase order is placed, to sell the purchased shares of the trading block.

For example, a range of trading blocks as shown in FIG. 4 can be defined where each trading block has as defined purchase price and sale price. Also, an amount of the $200,000, such as 2.84%, can be specified to use to purchase shares for each trading block.

In this way, when the ETF reaches the purchase price of a trading block, a previously placed purchase order will be executed to buy shares of the ETF at the purchase price using the percentage of the investment funds, and a conditional sale order will activate to sell the purchased shares when the ETF reaches the sale price.

Figure 6:
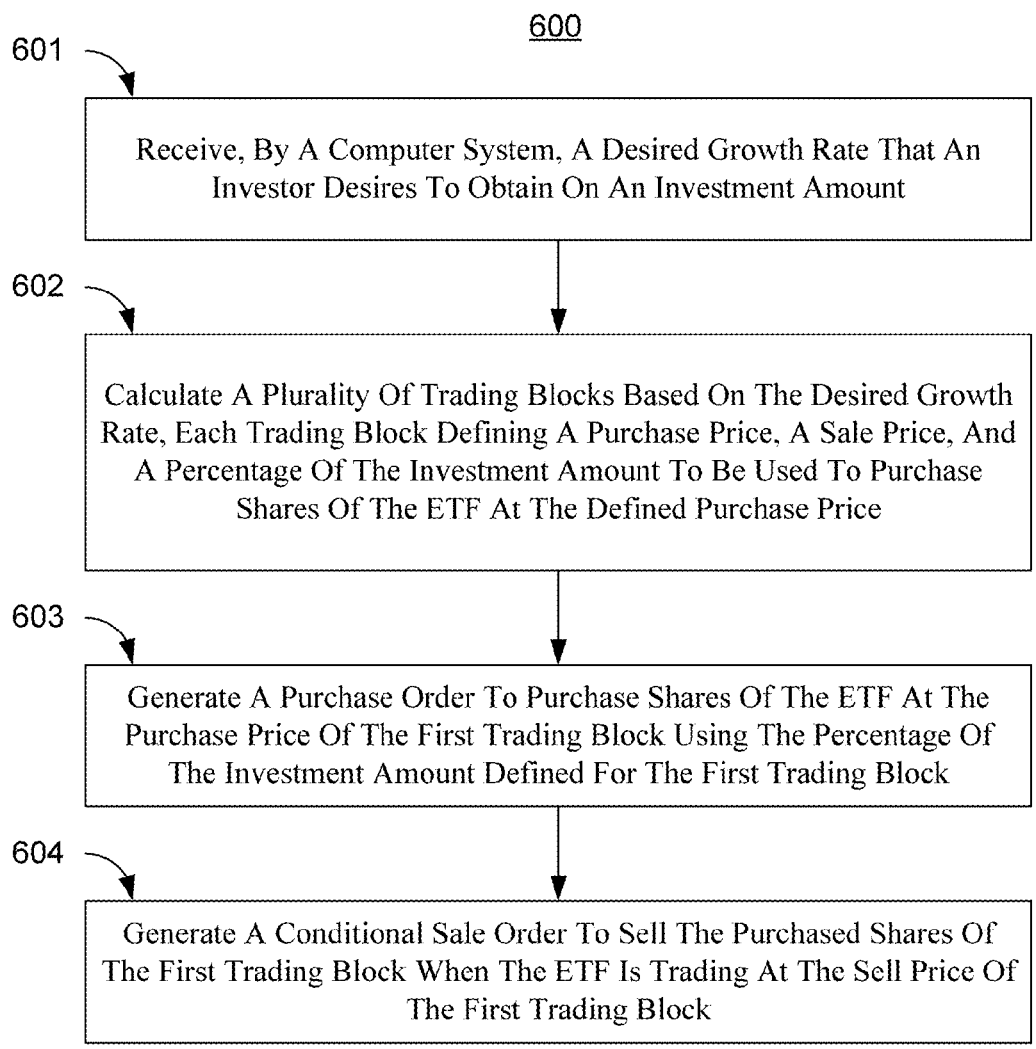

FIG. 6 illustrates a flow chart of an exemplary method 600 for investing in an ETF. Method 600 will be described with respect to the figures.

Method 600 includes an act 601 of receiving a desired growth rate that an investor desires to obtain on an investment amount.

Method 600 includes an act 602 of calculating a plurality of trading blocks based on the desired growth rate, each trading block defining a purchase price, a sale price, and a percentage of the investment amount to be used to purchase shares of the ETF at the defined purchase price. For example, a range of trading blocks as shown in FIG. 4 can be defined where each trading block has as defined purchase price and sale price. The percentage of the investment amount can be defined as a number of shares, a dollar amount, or some other way of defining an amount to be used. The percentage of the investment for at least some trading blocks can be dynamically determined based on the performance of other trading blocks.

Method 600 includes an act 603 of generating a purchase order to purchase shares of the ETF at the purchase price of the first trading block using the percentage of the investment amount defined for the first trading block.

Method 600 includes an act 604 of generating a conditional sale order to sell the purchased shares of the first trading block when the ETF is trading at the sell price of the first trading block.

Figure 7:
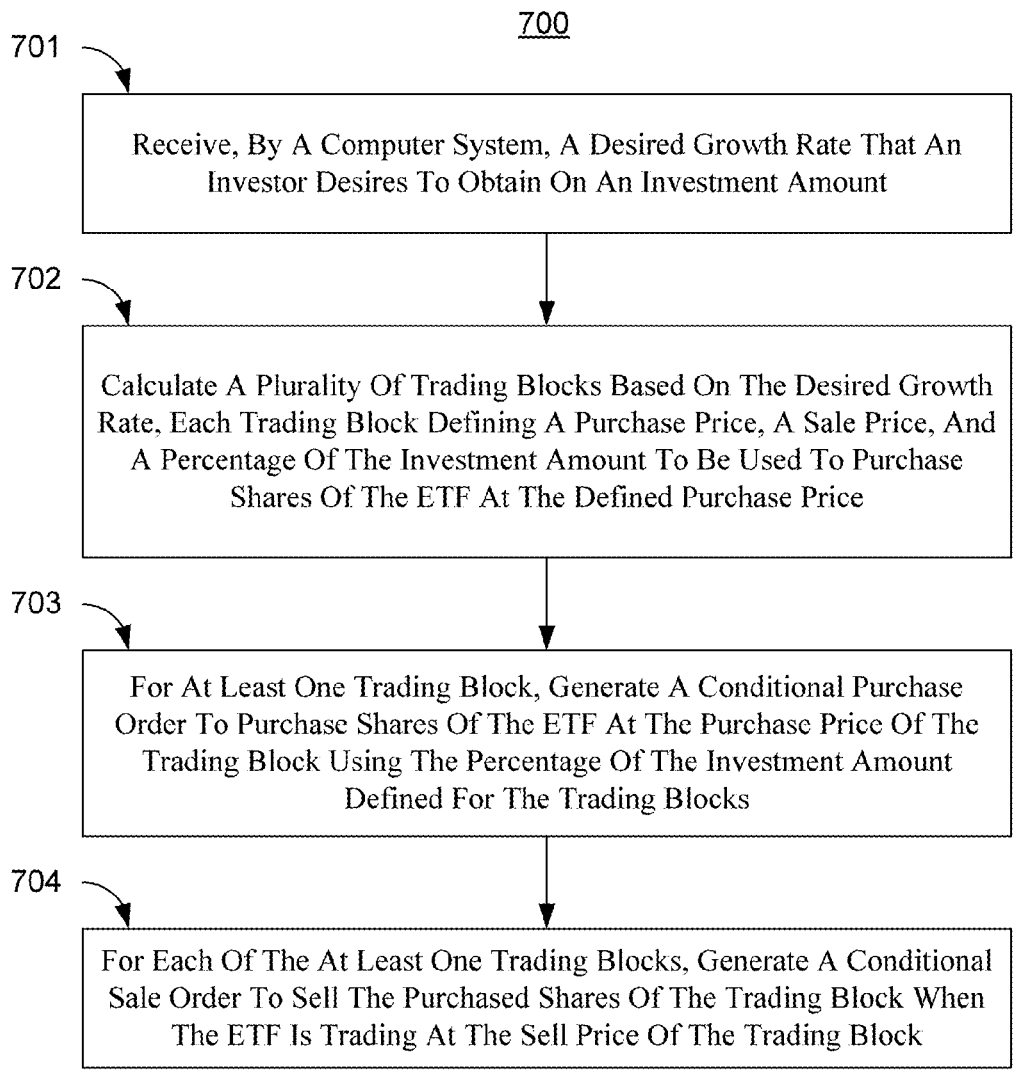

FIG. 7 illustrates a flow chart of an exemplary method 700 for investing in an ETF. Method 700 will be described with respect to the figures.

Method 700 includes an act 701 of receiving a desired growth rate that an investor desires to obtain on an investment amount.

Method 700 includes an act 702 of calculating a plurality of trading blocks based on the desired growth rate, each trading block defining a purchase price, a sale price, and a percentage of the investment amount to be used to purchase shares of the ETF at the defined purchase price.

Method 700 includes an act 703 of, for at least one trading block, generating a purchase order to purchase shares of the ETF at the purchase price of the trading block using the percentage of the investment amount defined for the trading blocks. For example, one or more purchase orders can be placed such as indicated by 403 in FIG. 4. In some cases, a specified number of purchase orders can be maintained at any time.

Method 700 includes an act 704 of, for each of the at least one trading blocks, generating a conditional sale order to sell the purchased shares of the trading block when the ETF is trading at the sell price of the trading block.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, performed by one or more processors of a computer system, for investing in an exchange traded fund (ETF), the method comprising:
   receiving, by the one or more processors of the computer system, user input that defines a desired growth rate that an investor desires to obtain on an investment amount;
   calculating, by the one or more processors of the computer system, a plurality of trading blocks based on the desired growth rate, each trading block defining a purchase price, a sale price, and a percentage of the investment amount to be used to purchase shares of the ETF at the defined purchase price;
   storing, by the one or more processors of the computer system, the plurality of trading blocks in a computer storage medium of the computer system;
   accessing, by the one or more processors of the computer system, a first trading block of the plurality of trading blocks that is stored in the computer storage medium of the computer system, including identifying from the stored first trading block the purchase price, the sale price, and the percentage of the investment amount for the first trading block;
   generating, by the one or more processors of the computer system, a purchase order to purchase shares of the ETF at the purchase price of the first trading block using the percentage of the investment amount defined for the first trading block; and
   generating, by the one or more processors of the computer system, a conditional sale order to sell the purchased shares of the first trading block when the ETF is trading at the sell price of the first trading block.

2. The method of claim 1, further comprising:
   generating a purchase order to purchase shares of the ETF at the purchase price of a second trading block using the percentage of the investment amount defined for the second trading block; and
   generating a conditional sale order to sell the purchased shares of the second trading block when the ETF is trading at the sell price of the second trading block.

3. The method of claim 1, further comprising:
   generating a purchase order and a conditional sale order for one or more other trading blocks so that multiple purchase orders and conditional sale orders are pending at the same time.

4. The method of claim 2, wherein between three and five purchase orders are pending at the same time.

5. The method of claim 1, wherein the trading blocks are arranged consecutively such that the sale price of a trading block is the same as the purchase price of a neighboring block.

6. The method of claim 1, wherein the percentage of the investment amount for at least one trading block is modified based on one or more purchases or sales of shares of other trading blocks.

7. The method of claim 1, wherein the percentage of the investment amount comprises a number of shares to purchase at the purchase price of the trading block.

8. The method of claim 1, wherein generating a purchase order and generating a conditional sale order comprise communicating orders to a trading brokerage.

9. A computer system comprising:
   one or more processors; and
   memory storing computer executable instructions which when executed by the one or more processors perform the following:
      receiving, by the one or more processors of the computer system, user input that defines a desired growth rate that an investor desires to obtain on an investment amount;
      calculating, by the one or more processors of the computer system, a plurality of trading blocks based on the desired growth rate, each trading block defining a purchase price, a sale price, and a percentage of the investment amount to be used to purchase shares of the ETF at the defined purchase price;
      storing, by the one or more processors of the computer system, the plurality of trading blocks in a computer readable medium of the computer system;
      accessing, by the one or more processors of the computer system, a first trading block of the plurality of trading blocks that is stored in the computer readable medium of the computer system, including identifying from the stored first trading block the purchase price, the sale price, and the percentage of the investment amount for the first trading block;
      generating, by the one or more processors of the computer system, a purchase order to purchase shares of the ETF at the purchase price of the first trading block using the percentage of the investment amount defined for the first trading block; and
      generating, by the one or more processors of the computer system, a conditional sale order to sell the purchased shares of the first trading block when the ETF is trading at the sell price of the first trading block.

10. The computer system of claim 9, wherein the computer executable instructions, when executed by the one or more processors, further perform the following:
    generating a purchase order to purchase shares of the ETF at the purchase price of a second trading block using the percentage of the investment amount defined for the second trading block; and
    generating a conditional sale order to sell the purchased shares of the second trading block when the ETF is trading at the sell price of the second trading block.

11. The computer system of claim 10, wherein between three and five purchase orders are pending at the same time.

12. The computer system of claim 9, wherein the computer executable instructions, when executed by the one or more processors, further perform the following:
    generating a purchase order and a conditional sale order for one or more other trading blocks so that multiple purchase orders and conditional sale orders are pending at the same time.

13. The computer system of claim 9, wherein the trading blocks are arranged consecutively such that the sale price of a trading block is the same as the purchase price of a neighboring block.

14. The computer system of claim 9, wherein the percentage of the investment amount for at least one trading block is modified based on one or more purchases or sales of shares of other trading blocks.

15. The computer system of claim 9, wherein the percentage of the investment amount comprises a number of shares to purchase at the purchase price of the trading block.

16. The computer system of claim 9, wherein generating a purchase order and generating a conditional sale order comprise communicating orders to a trading brokerage.

17. One or more non-transitory computer storage media storing computer executable instructions which when executed by one or more processors of a computer system perform the following:

receiving, by the one or more processors of the computer system, user input that defines a desired growth rate that an investor desires to obtain on an investment amount;

calculating, by the one or more processors of the computer system, a plurality of trading blocks based on the desired growth rate, each trading block defining a purchase price, a sale price, and a percentage of the investment amount to be used to purchase shares of the ETF at the defined purchase price;

storing, by the one or more processors of the computer system, the plurality of trading blocks in a computer readable medium of the computer system;

accessing, by the one or more processors of the computer system, a first trading block of the plurality of trading blocks that is stored in the computer readable medium of the computer system, including identifying from the stored first trading block the purchase price, the sale price, and the percentage of the investment amount for the first trading block;

generating, by the one or more processors of the computer system, a purchase order to purchase shares of the ETF at the purchase price of the first trading block using the percentage of the investment amount defined for the first trading block; and generating, by the one or more processors of the computer system, a conditional sale order to sell the purchased shares of the first trading block when the ETF is trading at the sell price of the first trading block.

18. The computer storage media of claim 17, wherein the trading blocks are arranged consecutively such that the sale price of a trading block is the same as the purchase price of a neighboring block.

19. The computer storage media of claim 17, wherein the percentage of the investment amount for at least one trading block is modified based on one or more purchases or sales of shares of other trading blocks.

20. The computer storage media of claim 17, wherein the percentage of the investment amount comprises a number of shares to purchase at the purchase price of the trading block.

* * * * *